US012063488B2

(12) United States Patent
Jose et al.

(10) Patent No.: US 12,063,488 B2
(45) Date of Patent: Aug. 13, 2024

(54) AUDIO PANEL TEMPERATURE CONTROL

(71) Applicant: Google LLC, Mountain View, CA (US)

(72) Inventors: Jennis Jose, Mountain House, CA (US); Ian Peter Lewis, Grayslake, IL (US); Chia Cheng Weng, Taoyuan (TW); TeYuan Wang, Taipei (TW); Dominic Todd Pinchott, Chicago, IL (US); Paul Brian Crosbie, Grayslake, IL (US); Wael Essam Enan, Mountain View, CA (US); Michael Scot Pate, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/639,371

(22) PCT Filed: Dec. 14, 2020

(86) PCT No.: PCT/US2020/064866
§ 371 (c)(1),
(2) Date: Mar. 1, 2022

(87) PCT Pub. No.: WO2022/132126
PCT Pub. Date: Jun. 23, 2022

(65) Prior Publication Data
US 2023/0353936 A1 Nov. 2, 2023

(51) Int. Cl.
*H04R 3/00* (2006.01)
*H04R 7/04* (2006.01)

(52) U.S. Cl.
CPC ............. *H04R 3/007* (2013.01); *H04R 7/045* (2013.01); *H04R 2430/01* (2013.01); *H04R 2499/11* (2013.01)

(58) Field of Classification Search
CPC .... H04R 3/007; H04R 7/045; H04R 2430/01; H04R 2499/11; H04R 29/001; H04R 2499/15
See application file for complete search history.

(56) References Cited

U.S. PATENT DOCUMENTS 5,900,851 A * 5/1999 Toffolo .................... G09G 3/30 345/36
2014/0146033 A1 * 5/2014 Koyama ............. G09G 3/3655 345/212
(Continued)

FOREIGN PATENT DOCUMENTS

CN 108566592 9/2018
CN 109889640 6/2019
WO WO 2019/172633 9/2019

OTHER PUBLICATIONS

International Search Report and Written Opinion in International Appln. No. PCT/US2020/064866, dated Nov. 8, 2021, 19 pages.
(Continued)

*Primary Examiner* — Angelica M McKinney
(74) *Attorney, Agent, or Firm* — Fish & Richardson P.C.

(57) ABSTRACT

A mobile device includes a panel audio loudspeaker including a display panel and an actuator coupled to the display panel. The mobile device includes a temperature sensor arranged to sense a temperature of the display panel, and an electronic control module in communication with the actuator and the temperature sensor. The electronic control module is programmed to perform operations including: obtaining, from the temperature sensor, data indicating a temperature of the display panel; and based on the data indicating the temperature of the display panel, adjusting a power signal provided to the actuator to drive the panel audio loudspeaker. The power signal can be adjusted by selecting, based on the data indicating the temperature of the
(Continued)

display panel, a target temperature of the display panel; mapping the target temperature to a target power level; and changing the power signal provided to the actuator to the target power level.

20 Claims, 6 Drawing Sheets

(56) References Cited

U.S. PATENT DOCUMENTS

| | | | | |
|---|---|---|---|---|
| 2017/0094037 | A1* | 3/2017 | Gaurav | H04M 1/6066 |
| 2017/0345352 | A1* | 11/2017 | Hemminki | G09G 3/006 |
| 2018/0090062 | A1* | 3/2018 | Nakamura | G09G 3/3233 |
| 2018/0096661 | A1* | 4/2018 | Zhao | G09G 3/3648 |
| 2019/0261092 | A1 | 8/2019 | Landick | |
| 2020/0137486 | A1* | 4/2020 | Paranjape | G10L 15/08 |
| 2020/0344547 | A1* | 10/2020 | Lee | H04R 7/26 |
| 2021/0409865 | A1* | 12/2021 | Dayan | H04R 3/007 |

OTHER PUBLICATIONS

Invitation to Pay Additional Fees in International Appln. No. PCT/US2020/064866, dated Sep. 15, 2021, 10 pages.

International Preliminary Report on Patentability in International Appln. No. PCT/US2020/064866, dated Jun. 29, 2023, 12 pages.

Office Action in European Application No. 20838836.3, dated Jan. 4, 2024, 9 pages.

* cited by examiner

AUDIO PANEL TEMPERATURE CONTROL

CROSS-REFERENCE TO RELATED APPLICATION

This application is a National Stage Application under 35 U.S.C. § 371 and claims the benefit of International Application No. PCT/US2020/064866, filed Dec. 14, 2020. The disclosure of the foregoing application is hereby incorporated by reference in its entirety.

TECHNICAL FIELD

This disclosure application relates generally to audio speakers.

BACKGROUND

This specification relates to mobile devices including panel audio loudspeakers with actuators coupled to display panels.

Many electronic devices are capable of presenting multimedia content by including speakers which provide tonal, voice-generated, or recorded output. Panel audio loudspeakers can produce sound by inducing distributed vibration modes in a panel through an electro-acoustic actuator. The panel can include a display panel, for example. Typically, the actuators are electro-magnetic or piezoelectric actuators.

SUMMARY

This specification describes techniques, methods, systems, and other mechanisms for controlling temperature of a panel in a panel audio device. High temperatures may be dangerous to a user of the device, may cause damage to components of the device, or both. Accordingly, the temperature of the panel of a panel audio device should be maintained below temperature limits that are set to ensure user safety and to prevent equipment damage.

A panel audio loudspeaker can include an actuator that provides a force to a panel, causing the panel to vibrate to produce audible sound waves. Due to the actuator's physical coupling to the display panel, the actuator may be in thermal communication with the panel such that heat dissipation occurs from the actuator to the panel. This causes panel temperature to be affected by actuator operation. For example, higher actuator power levels may result in higher panel temperatures, while lower actuator power levels may result in lower panel temperatures.

The panel of the panel audio loudspeaker may be, for example, a display panel of a mobile telephone, smart watch, or head-mounted display. It is desirable to measure, monitor, and control temperature of the panel. For example, it may be desirable to maintain a panel temperature below 45 degrees Celsius to reduce risk of injury and damage.

The disclosed techniques can be used to maintain panel temperatures below a thermal limits threshold at which the panel can be damaged or cause injury while maintaining sound quality of the actuator. While it is desirable to limit panel temperatures, it is also desirable to avoid muting and unmuting a panel audio loudspeaker based on panel temperatures. Therefore, to maintain a safe panel temperature without fully muting and unmuting the actuator, actuator power can be mapped to corresponding predicted panel temperatures. The electronic control module of the device may be programmed to adjust actuator power to reduced levels without fully muting the actuator. This results in gradual changes to actuator power based on changes in panel temperature. Gradual adjustments to actuator power can result in smooth reduction and raising of sound volume that may be unnoticeable to a user.

In general, one innovative aspect of the subject matter described in this specification can be embodied in a mobile device, including: a panel audio loudspeaker including: a display panel; and an actuator coupled to the display panel; a temperature sensor arranged to sense a temperature of the display panel; and an electronic control module in communication with the actuator and the temperature sensor, programmed to perform operations including: obtaining, from the temperature sensor, data indicating a temperature of the display panel; and based on the data indicating the temperature of the display panel, adjusting a power signal provided to the actuator to drive the panel audio loudspeaker.

The foregoing and other embodiments can each optionally include one or more of the following features, alone or in combination. In some implementations, the electronic control module is programmed to adjust the power signal provided to the actuator by: selecting, based on the data indicating the temperature of the display panel, a target temperature of the display panel; mapping the target temperature of the display panel to a target power level of the actuator; and changing the power signal provided to the actuator to the target power level.

In some implementations, the temperature sensor includes a thermistor.

In some implementations, the temperature sensor is coupled to the display panel.

In some implementations, the temperature sensor is coupled to a housing, to a processor, or to a circuit board of the mobile device.

In some implementations, the electronic control module is programmed to adjust the power signal provided to the actuator by reducing the power signal provided to the actuator to a reduced power level.

In some implementations, the mobile device includes an amplifier configured to provide the power signal to the actuator and the electronic control module is programmed to adjust the power signal provided to the actuator by adjusting a gain of the amplifier.

In some implementations, the electronic control module is programmed to perform operations including: determining that the temperature of the display panel exceeds a temperature threshold; determining that the actuator is in operation; and based on determining that the temperature of the display panel exceeds the temperature threshold and that the actuator is in operation, adjusting the power signal provided to the actuator to a reduced power level.

In some implementations, the electronic control module is programmed to perform operations including: determining that the temperature of the display panel is below a temperature threshold; determining that the actuator is in operation; and based on determining that the temperature of the display panel is below the temperature threshold and that the actuator is in operation, adjusting the power signal provided to the actuator to a raised power level.

In some implementations, the electronic control module is programmed to perform operations including: determining that the temperature of the display panel exceeds a first temperature threshold; based on determining that the temperature of the display panel exceeds the first temperature threshold, adjusting the power signal provided to the actuator from an initial power level to a first reduced power level; determining that the temperature of the display panel exceeds a second temperature threshold; and based on determining that the temperature of the display panel exceeds the second temperature threshold, adjusting the power signal provided to the actuator to a second reduced power level, the second reduced power level being lower than the first reduced power level.

In some implementations, the difference between the initial power level and the first reduced power level is the same as the difference between the first reduced power level and the second reduced power level.

In some implementations, the difference between the initial power level and the first reduced power level is less than the difference between the first reduced power level and the second reduced power level.

In some implementations, the difference between the initial power level and the first reduced power level is greater than the difference between the first reduced power level and the second reduced power level.

In some implementations, adjusting the power signal provided to the actuator includes adjusting a gain of the power signal within a programmed range of frequencies.

In some implementations, the programmed range of frequencies is 10 kHz or greater.

In some implementations, the programmed range of frequencies is 400 Hz or less.

In some implementations, the electronic control module is programmed to perform operations including: obtaining, from a second temperature sensor, data indicating a temperature of a processor of the mobile device; and based on the data indicating the temperature of the processor of the mobile device and the data indicating the temperature of the display panel, adjusting the power signal provided to the actuator.

In some implementations, the electronic control module is programmed to perform operations including: obtaining, from a second temperature sensor, data indicating a temperature of a housing of the mobile device; and based on the data indicating the temperature of the housing of the mobile device and the data indicating the temperature of the display panel, adjusting the power signal provided to the actuator.

In some implementations, the electronic control module is programmed to perform operations including: obtaining data indicating: one or more current operations of the mobile device; and a priority level for each of the one or more current operations of the mobile device; determining that the priority level for at least one of the one or more current operations of the mobile device is a higher priority level than operation of the actuator; and based on determining that the priority level for at least one of the one or more current operations of the mobile device is a higher priority level than operation of the actuator, adjusting the power signal provided to the actuator.

In some implementations, the electronic control module includes one or more of an audio signal source, an amplifier, and a digital signal processor.

In some implementations, the mobile device includes a mobile phone or a tablet computer.

Another innovative aspect of the subject matter described in this specification can be embodied in a method for driving a panel audio loudspeaker including a display panel and an actuator coupled to the display panel, the method including: obtaining, from a temperature sensor arranged to sense a temperature of the display panel, data indicating a temperature of the display panel; and based on the data indicating the temperature of the display panel, adjusting a power signal provided to the actuator to drive the panel audio loudspeaker.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
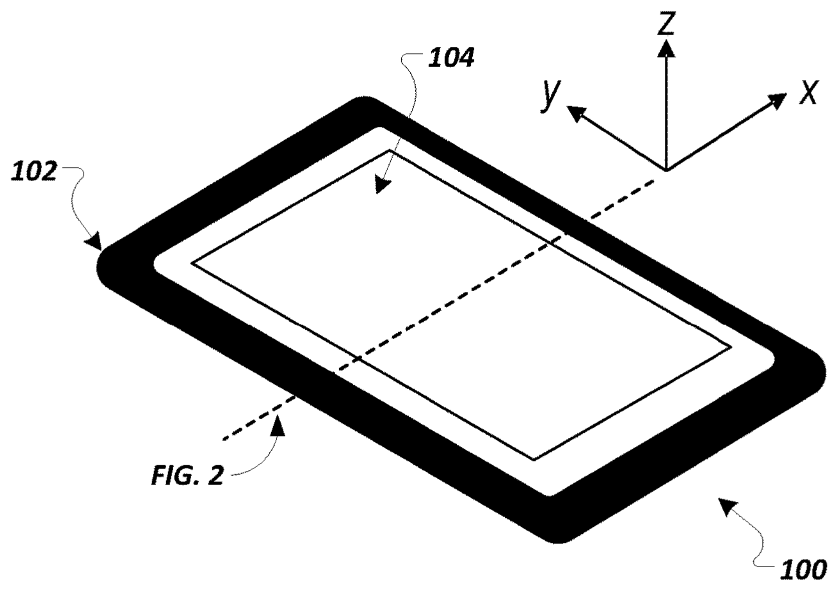
FIG. 1 is a perspective view of an embodiment of a mobile device.

In general, actuator modules can be used in a variety of applications. For example, in some embodiments, an actuator module can be used to drive a panel of a panel audio loudspeaker, such as a distributed mode loudspeaker (DML). Such loudspeakers can be integrated into a mobile device, such as a mobile phone, a smart watch, or a head-mounted display. For example, referring to FIG. 1, a mobile device 100 includes a device chassis 102 and a panel 104 including a flat panel display (e.g., an OLED or LCD display panel) that integrates a panel audio loudspeaker. Mobile device 100 interfaces with a user in a variety of ways, including by displaying images and receiving touch input via panel 104. Typically, a mobile device has a depth (in the z-direction) of approximately 10 mm or less, a width (in the x-direction) of 60 mm to 80 mm (e.g., 68 mm to 72 mm), and a height (in the y-direction) of 100 mm to 160 mm (e.g., 138 mm to 144 mm). A Cartesian coordinate system is shown in FIG. 1 for reference.

The mobile device 100 also produces audio output. The audio output is generated using a panel audio loudspeaker that creates sound by causing the flat panel display to vibrate. The display panel is coupled to an actuator, such as a distributed mode actuator (DMA) or a moving magnet actuator. The actuator is a movable component arranged to provide a force to a panel, such as the panel 104, causing the panel to vibrate. The vibrating panel generates human-audible sound waves, e.g., in the range of 20 Hz to 20 kHz.

Generally, the efficiency of the actuator to produce audible sound waves varies as a function of frequency depending on the properties of the actuator, the panel, and the coupling of the actuator to the panel. Typically, the actuator/panel system will exhibit one or more resonant frequencies representing frequencies at which the sound pressure level as a function of frequency has a local maximum. It is generally desirable, however, for a panel audio loudspeaker to maintain a relatively high sound pressure level across the entire audio frequency spectrum.

In addition to producing sound output, the mobile device 100 can also produce haptic output using the actuator. For example, the haptic output can correspond to vibrations in the range of 180 Hz to 300 Hz.

Figure 2:
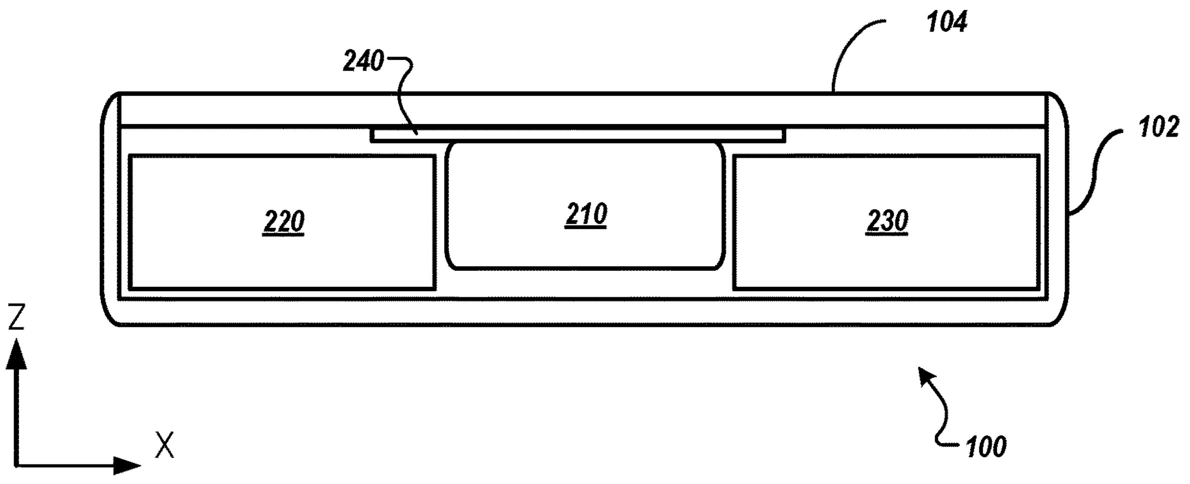
FIG. 2 is a schematic cross-sectional view of the mobile device of FIG. 1.

FIG. 1 also shows a dashed line that corresponds to the cross-sectional direction shown in FIG. 2. Referring to FIG. 2, a cross-section of mobile device 100 illustrates device chassis 102 and the panel 104. FIG. 2 also includes a Cartesian coordinate system with x, y, and z axes, for ease of reference. The device chassis 102 has a depth measured along the z-direction and a width measured along the x-direction. The device chassis 102 also has a back panel, which is formed by the portion of device chassis 102 that extends primarily in the x-y plane. The mobile device 100 includes the actuator 210, which is housed behind the panel 104 in the chassis 102 and attached to the back side of the panel 104. A pressure sensitive adhesive (PSA) 240 can attach the actuator 210 to the panel 104. Generally, the actuator 210 is sized to fit within a volume constrained by other components housed in the chassis, including an electronic control module 220 and a battery 230.

The actuator 210 can be configured to convert electrical energy into acoustic energy. The actuator 210 can be controlled by the electronic control module 220. The electronic control module 220 can be composed of one or more electronic components that receive input from one or more sensors and/or signal receivers of the mobile device 100, process the input, and generate and deliver signal waveforms that cause actuator 210 to provide a suitable haptic response. The electronic control module 220 can be in communication with the actuator 210.

Referring to FIG. 2, the actuator 210 includes an actuator 210 and the PSA 240. The PSA 240 allows the actuator 210 to be affixed to the panel 104. The actuator 210 can be relatively compact. For example, the actuator module's height (i.e., its dimension in the z-direction) can be about 10 mm or less (e.g., 8 mm or less, 6 mm or less, 5 mm or less).

During operation, the electronic control module 220 energizes the actuator 210 by providing a power signal to the actuator 210 to drive the panel audio loudspeaker. The resulting magnetic flux interacts with a suspended magnet, and the resulting vibrations are transferred to the panel 104.

The actuator 210 can be constructed using a thin wire, e.g., a voice coil that is suspended within a magnetic field generated by a magnet. When an analog signal, which can be an input voltage signal, passes through the actuator 210, an electro-magnetic field is produced. The electro-magnetic field signal strength is determined by the current flowing through the voice coil.

The actuator 210 is attached to a surface of the panel 104, which also moves in tandem. The actuator 210 may be affixed to the surface of the panel 104 by an adhesive, e.g., a pressure sensitive adhesive, a liquid adhesive, etc. Movement of the panel can cause a disturbance in the air around it, thus producing a sound. In the instances where the input signal is a sine wave, then the panel 104 will pulsate (e.g., in and out) which pushes air as it moves, and generates an audible tone, representing the frequency of the signal. The strength, and therefore the velocity, by which the panel 104 moves and pushes the surrounding air may be determined at least in part based on the input signal applied to the actuator 210.

The actuator 210 can be in thermal communication with the panel 104. When in thermal communication with the panel, heat can flow, or transfer, from the actuator 210 to the panel 104, and from the panel 104 to the actuator 210. For example, when the electronic control module 220 drives the actuator 210, current flows through the actuator 210, heating the actuator 210. Heat from the actuator 210 may then transfer to the panel 104.

During operation of the actuator 210, panel temperature may rise. As the panel 104 receives heat from the actuator 210, the panel 104 may also lose heat to ambient. Thus, during operation, the panel temperature may rise at a slower rate of change than the actuator temperature, and the panel temperature may remain lower than the actuator temperature. Changes in actuator power can therefore cause lagging changes to panel temperature. For example, an increase in actuator power may cause a lagging increase in panel temperature, while a decrease in actuator power may cause a lagging decrease in panel temperature.

Figure 3:
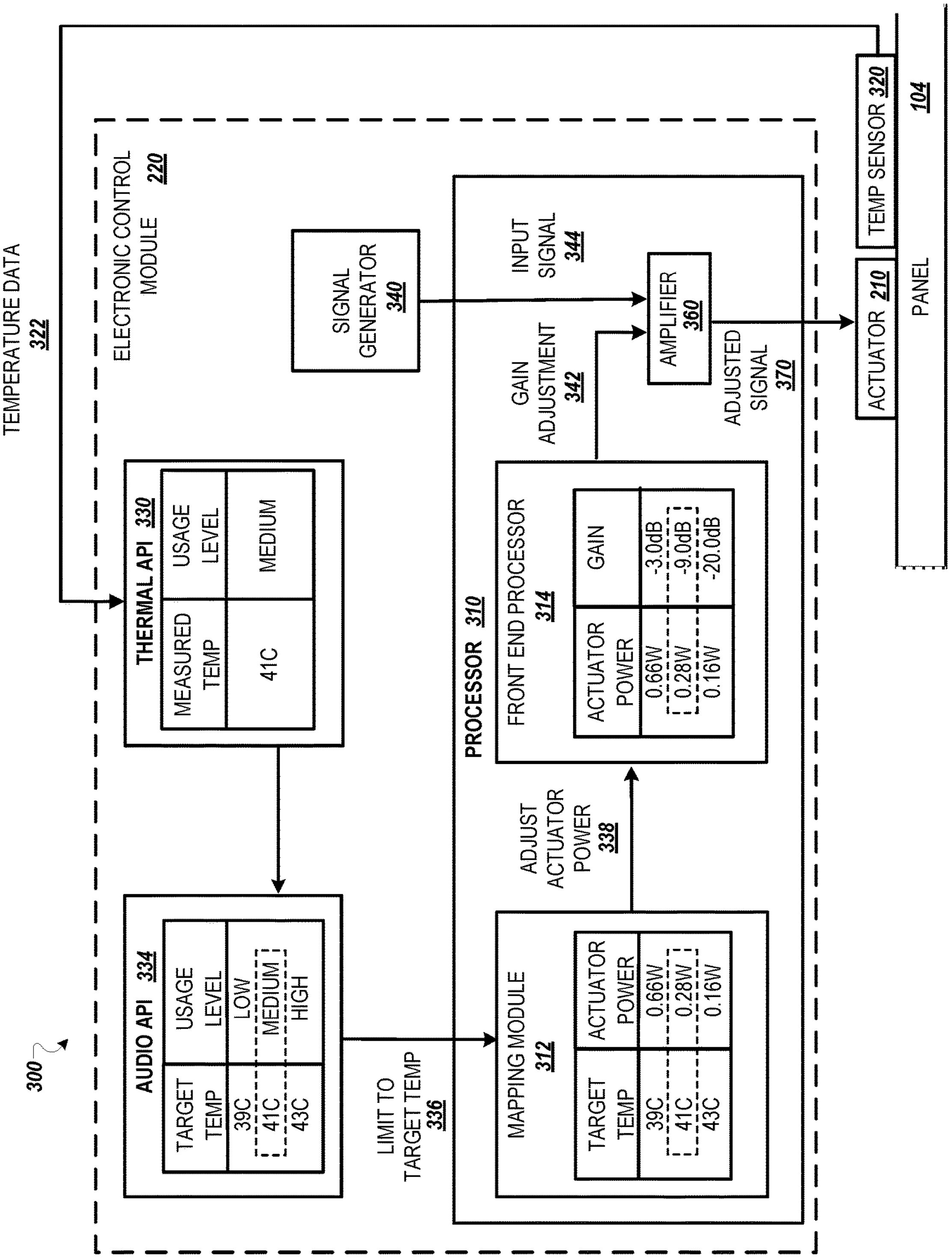
FIG. 3 is a block diagram of an example system configured to control temperature of a panel in a panel audio device.

FIG. 3 is a block diagram of an example system 300 configured to control temperature of a panel in a panel audio device. The system 300 includes the electronic control module 220, the actuator 210, the panel 104, and a temperature sensor 320. The electronic control module 220 includes a signal generator 340, a thermal application programming interface (API) 330, an audio API 334, a processor 310, and an amplifier 360. The processor 310 includes a mapping module 312 and a front end processor 314.

In general, operations of the system 300 are as follows. The actuator 210 is in communication with the electronic control module 220, e.g., through a wired or wireless connection. The actuator 210 can receive, as input, an electrical power signal that has been output from the amplifier 360. The electrical signal is applied to the actuator 210.

The actuator 210 is thermally coupled to the display panel. The actuator 210 is energized by the amplified electrical signal output by the amplifier 360. As power signal from the amplified electrical signal flows through the actuator 210, the actuator vibrates, causing vibration of the panel 104. The panel 104, in thermal communication with the actuator 210, may receive heat transferred from the actuator 210, causing the panel temperature to rise.

The temperature sensor 320 is arranged to sense a temperature of the panel 104. The temperature sensor 320 can be, for example, a thermistor. In some examples, the temperature sensor 320 can be coupled to a surface of the panel 104. In some examples, the temperature sensor may be attached to the same surface of the panel 104 as the surface to which the actuator 210 is coupled. The temperature sensor can output a resistance indicative of the temperature of the location of the panel where the thermistor is attached.

In some examples, the temperature sensor 320 may be located at a "hot spot" of the panel 104. For example, certain regions of the panel 104 may generally become hotter than other regions of the panel 104 during operation of the panel audio loudspeaker, and can be considered hot spots. In some examples, the temperature sensor 320 may be located at a location of the panel 104 that is not a hot spot.

In some examples, the temperature sensor can be coupled to a component of the mobile device other than the panel. For example, the temperature sensor may be coupled to a component such as the actuator, a circuit board, or the housing of the mobile device. The electronic control module 220 may be programmed to estimate the temperature of the panel 104 based on temperature data indicating a temperature of the component to which the temperature sensor is attached.

The temperature sensor 320 is in communication with the electronic control module 220. The temperature sensor 320 measures the temperature of the surface of the display panel and outputs the temperature data 322 to the thermal API 330 of the electronic control module 220. In some examples, the temperature data 322 includes data indicating a resistance that corresponds to a temperature of the panel 104. In some examples, the temperature data 322 includes data indicating a temperature of the panel 104, e.g., in degrees Celsius (C). The temperature data 322 can be accurate, for example, to the millidegree.

In some examples, the electronic control module 220 may estimate a temperature of a "hot spot" of the panel 104 based on the temperature data 322. For example, the temperature sensor 320 may be located at a position of the panel 104 that is not a hot spot, or may be attached to a component of the mobile device other than the panel 104. The electronic control module 220 may be programmed to estimate that a temperature of a hot spot of the panel 104 is hotter than the location of the temperature sensor. For example, the temperature of the hot spot may be estimated to be hotter than the location of the temperature sensor 320 by a number of degrees (e.g., between 1 C and 3 C hotter), or by a percentage (e.g., between five percent and ten percent hotter). Thus, based on temperature data 322 indicating a temperature of a location of the panel 104 that is not a hot spot, the electronic control module 220 can estimate a temperature of a hot spot of the panel 104.

In some examples, multiple temperature sensors 320 may be arranged to sense the temperature of the panel 104. For example, a first temperature sensor may be coupled to the panel 104 at a first location, and a second temperature sensor may be coupled to the panel 104 at a second location. The electronic control module 220 may obtain temperature data from the multiple temperature sensors. In some examples, the electronic control module 220 can determine to adjust actuator power based on an average, or weighted average, of temperature data from the multiple temperature sensors. In some examples, the electronic control module 220 can determine to adjust actuator power based on the highest measured temperature from the multiple temperature sensors.

The electronic control module 220 is programmed to obtain, from the temperature sensor 320, the data indicating the temperature of the panel 104. Based on the data indicating the temperature of the panel 104, the electronic control module 220 may determine to adjust the electrical power signal provided to the actuator 210.

The thermal API can be, for example, a hardware abstraction layer (HAL)-based API. The thermal API may receive data indicating a usage level of the mobile device. The usage level can be based on the operations being performed by the mobile device. For example, the usage level can be based on the usage of the CPU, modem, camera, etc. of the mobile device. In some examples, the usage level can be based on the total system power load of the mobile device.

For example, the usage level may be low, medium, high, or maximum. A low usage level can be, for example, a usage level that includes the mobile device playing audio, e.g., music, a podcast, or an audiobook. At a low usage level, the system power load may be approximately 1.00 Watt (W) (e.g., in a range from about 0.80 W to about 1.50 W, such as about 0.90 W, about 1.10 W). A medium usage level can be, for example, a usage level that includes the mobile device playing a video, e.g., including visual images and audio. At a medium usage level, the system power load may be approximately 2.20 W (e.g., in a range from about 1.50 W to about 2.40 W, such as about 2.00 W, about 2.10 W, about 2.30 W). A high usage level can be, for example, a usage level that includes the mobile device performing gaming operations. At a high usage level, the system power load may be approximately 2.70 W (e.g., in a range from about 2.50 W to about 2.90 W, such as about 2.60 W, about 2.80 W). A maximum usage level can be, for example, a usage level that is at or near a limit such as a system power load limit. A maximum usage level can be, for example, a usage level that includes the mobile device performing extreme gaming operations. At a maximum usage level, the system power load may be approximately 3.00 W, (e.g., in a range from about 2.90 W to about 3.30 W, such as about 3.10 W, about 3.20 W).

In the example of FIG. 3, based on the temperature data 322, the thermal API determines a measured temperature of the panel 104 of 41.0 C. The thermal API also determines a usage level of medium. The thermal API 330 outputs the measured temperature of the panel 104 and the usage level of the mobile device to the audio API 334. Similar to the thermal API, the audio API 334 may be a HAL-based API. Based on the measured temperature of the panel 104, and the usage level of the mobile device, the audio API 334 determines whether or not to throttle power to the actuator 210.

In some examples, the audio API 334 compares the temperature of the panel to a temperature threshold. The temperature threshold can be selected as a target maximum temperature for the panel. The target temperature for the panel may be based on the usage level of the mobile device. For example, at a low usage level, the target temperature may be about 39.0 C (e.g., in a range from about 37.0 C to about 41.0 C, such as about 38.0 C, about 39.5 C, about 40.0 C). At a medium usage level, the target temperature may be about 41.0 C (e.g., in a range from about 40.0 C to about 42.0 C, such as about 40.5 C, about 41.5 C). At a high usage level, the target temperature may be about 43.0 C (e.g., in a range from about 42.0 C to about 44.0 C, such as about 42.5 C, about 43.5 C). At a maximum usage level, the target temperature may be about 45.0 C (e.g., in a range from about 43 C to about 47 C, such as about 44.0 C, about 45.0 C, about 46.0 C).

The temperature threshold can be, for example, a maximum allowable panel temperature. In some examples, the threshold panel temperature can be a panel temperature within a buffer range to the maximum allowable panel temperature. For example, a maximum allowable panel temperature may be 46.0 C. To provide a buffer range of 2.0 C, the threshold panel temperature may be set to 44.0 C.

The audio API 334 determines whether the actuator is in operation. For example, the audio API 334 may determine that the actuator is in normal operation, that the actuator is in operation at a reduced power level. The audio API may determine that the actuator is in normal operation based on the actuator power not being reduced or limited due to high panel temperature. The audio API may determine that the actuator is in operation at a reduced power level based on the actuator power being reduced due to high panel temperature.

The audio API 334 may determine that the temperature of the panel equals or exceeds a temperature threshold. In the example of FIG. 3, the audio API 334 determines that the measured temperature of 41.0 C is equal to the target temperature of 41.0 C at a medium usage level. Based on determining that the temperature of the panel equals the target temperature, and that the actuator is in operation, the audio API 334 can determine to limit the panel to the target temperature 336. The audio API 334 can then output a signal to the processor 310 instructing the processor 310 to limit, or throttle, the power signal to the actuator 210.

In some cases, the audio API 334 may determine that the temperature of the panel is below the temperature threshold. For example, the audio API 334 may determine that the temperature of the panel is 40.0 C at a medium usage level, which is below the target temperature of 41.0 C.

Based on determining that the temperature of the panel is below the target temperature, and that the actuator is in operation at a reduced power level, the audio API 334 may output a signal instructing the processor 310 not to limit the power signal to the actuator 210, or to adjust the power signal provided to the actuator to a higher reduced level.

In the example of FIG. 3, the processor 310 receives the signal instructing the processor 310 to limit the panel to the target temperature 336 by throttling the power signal to the actuator 210. The processor 310 can be, for example, a digital signal processor (DSP). The processor 310 changes the power signal provided to the actuator to the target power level. In some examples, the processor 310 changes the power signal by reducing the power signal provided to the actuator to a reduced power level. In some examples, the processor 310 is programmed to adjust the power signal provided to the actuator by adjusting a gain of an amplifier.

The mapping module 312 of the processor 310 maps the target temperature of the display panel to a target power level of the actuator 210. For example, the mapping module 312 selects an actuator power that corresponds to the target temperature. The mapping module 312 is programmed with mapping data that associates panel temperatures with actuator power levels. The mapping data can be based on experimental and/or simulated data indicating expected panel temperatures for various actuator power levels.

For example, for a target temperature of 39.0 C, a corresponding actuator power may be 0.66 W. For a target temperature of 43.0 C, a corresponding actuator power may be 0.16 W. In the example of FIG. 3, the mapping module 312 selects an actuator power of 0.28 W that corresponds to the target temperature of 41.0 C. The mapping module 312 outputs the adjusted actuator power 338 of 0.28 W to the front end processor 314.

The front end processor 314 determines a gain adjustment 342 to apply to the power signal in order to adjust the power signal to the adjusted actuator power 338. For example, to achieve an adjusted actuator power of 0.66 W, the front end processor 314 may determine a gain of −3.0 decibels (dB). To achieve an adjusted actuator power of 0.16 W, the front end processor 314 may determine a gain adjustment of −20.0 dB. In the example of FIG. 3, the front end processor 314 determines a gain adjustment of −9.0 dB to achieve an actuator power of 0.28 W. In some examples, the front end processor 314 may determine a positive gain adjustment in order to increase the power of the actuator 210. In some examples, the front end processor 314 may determine a gain adjustment of zero in order to maintain the current power of the actuator 210.

The front end processor 314 outputs the gain adjustment 342 to the amplifier 360. The amplifier 360 is configured to receive an input signal 344 from a signal generator 340 and to provide an adjusted signal 370 to the actuator 210.

The signal generator 340 can be an audio signal source that generates an audio signal. For example, the signal generator can generate a digital audio signal representing an audible sound to be produced by the panel 104. During operation, the audio signal provided to the actuator 210 may increase, decrease, or remain steady over time while the actuator 210 is in operation. For example, the audio signal may increase and decrease in power over time due to changes in audio volume, e.g., music or voice volume.

The processor 310 receives an audio signal from the signal generator 340. The processor 310 can process the audio signal, for example, by decoding, filtering, decompressing, transforming, and modulating the audio signal. In some examples, the processor 310 can adjust the audio signal by increasing or decreasing a power level of the audio signal with the amplifier 360. The amplifier 360 adjusts the audio signal. For example, the amplifier 360 can adjust the electrical signal by amplifying, or increasing, the voltage, current, or power of the electrical signal. In some examples, the amplifier 360 can adjust the electrical signal by reducing the voltage, power signal, or power of the electrical signal. The amplifier 360 outputs the adjusted signal 370 to the actuator 210.

When the power of the audio signal is reduced, the power signal through the actuator 210 is reduced. Due to the power signal being reduced, the actuator 210 may then increase temperature at a slower rate, cease increasing in temperature, or decrease in temperature. Due to thermal communication between the actuator 210 and the panel 104, the panel 104 may likewise increase temperature at a slower rate, cease increasing in temperature, or decrease in temperature. The electronic control module 220 can continue to monitor the temperature data 322 in order to control panel temperature.

Vibrations within a wide range of frequencies can affect panel temperature. In some examples, the processor 310 adjusts the power signal to the actuator 210 within a programmed range of frequencies. Certain frequencies may have a greater effect on sound quality than other frequencies. For example, frequencies between 400 Hz and 20 kHz may have a greater effect on sound quality than frequencies less than 400 Hz and frequencies greater than 20 kHz. Thus, the reduction of actuator power can be targeted to specific ranges of frequencies in order to reduce the impact on sound quality.

The programmed range of frequencies that are adjusted can be selected in order to reduce power of the audio signal at frequencies that do not affect sound quality, or that minimally affect sound quality. In some examples, the programmed range of frequencies is about 20 kHz or greater (e.g., 19 kHz or greater, 20.5 kHz or greater, 21 kHz or greater). In some examples, the programmed range of frequencies is about 400 Hz or less (e.g., 300 Hz or less, 450 Hz or less, 500 Hz or less). In some examples, the programmed range of frequencies includes frequencies at about 400 Hz or less and at about 20 kHz or greater.

In some examples, the processor 310 adjusts the power signal to the actuator 210 within a programmed range of frequencies that increases as panel temperature increases. For example, at a temperature of 41 C, the processor 310 may adjust the power signal to the actuator for frequencies less than 400 Hz and greater than 20 kHz. At a temperature of 42 C, the processor 310 may adjust the power signal to the actuator for frequencies less than 1 kHz and greater than 10 kHz. At a temperature of 43 C, the processor 310 may adjust the power signal to the actuator for all frequencies. In this way, frequencies that have the greatest effect on sound quality can remain unadjusted until the temperature of the panel 104 reaches higher temperatures. Thus, overall sound quality can be improved while limiting the panel temperature to safe levels.

In some examples, the processor 310 may adjust the power signal provided to the actuator for a designated period of time. For example, in response to determining that the panel temperature exceeds the threshold panel temperature, the processor 310 may determine to output an adjusted signal 370 that reduces the audio signal power for a period of time of one minute, ninety seconds, or two minutes. In some examples, following the period of time, the processor 310 can automatically remove the gain adjustment, thereby returning the power signal to the previous power level.

In some examples, the processor 310 can determine to remove the gain adjustment 342. For example, the processor 310 may have previously determined to apply a gain adjustment 342 to the input signal 344 to provide an adjusted signal 370 at a reduced power level. The processor 310 can continue to monitor the panel temperature after the gain adjustment 342 is applied. When the panel temperature returns below the programmed thresholds, the processor 310 can determine to remove the previously applied gain adjustment 342. For example, the processor 310 may remove the gain adjustment 342 by changing the gain to 0.0 dB.

In some examples, the electronic control module 220 is programmed to obtain, from a second temperature sensor, data indicating a temperature of components of the mobile device other than the panel 104. For example, in addition to, or instead of, the temperature sensor 320, the electronic control module 220 may obtain data indicating a temperature of components of the mobile device including a processor, a circuit board, a housing, etc. Based on the data indicating the temperature of the other components of the mobile device, the electronic control module 220 can adjust the power signal provided to the actuator.

In some examples, the electronic control module 220 is programmed to obtain data indicating one or more current operations of the mobile device. For example, the mobile device may be performing operations including camera operations, playing music, and internet searching. The electronic control module 220 can obtain data indicating a priority level for each of the operations of camera operations, playing music, and internet searching. The system can determine a priority level for each of the one or more current operations of the mobile device. The electronic control module 220 may determine that the priority level for at least one of the one or more current operations of the mobile device is a higher priority level than operation of playing music using the actuator. For example, the priority level for camera operations may be a higher priority level than for playing music.

Based on determining that the priority level for at least one of the one or more current operations of the mobile device is a higher priority level than operation of the actuator, the system can adjust the power signal provided to the actuator. For example, based on determining that the priority level for camera operations is a higher priority level than for playing music using the actuator, the electronic control module 220 can adjust the power signal provided to the actuator by reducing the power signal provided to the actuator 210.

Figure 4:
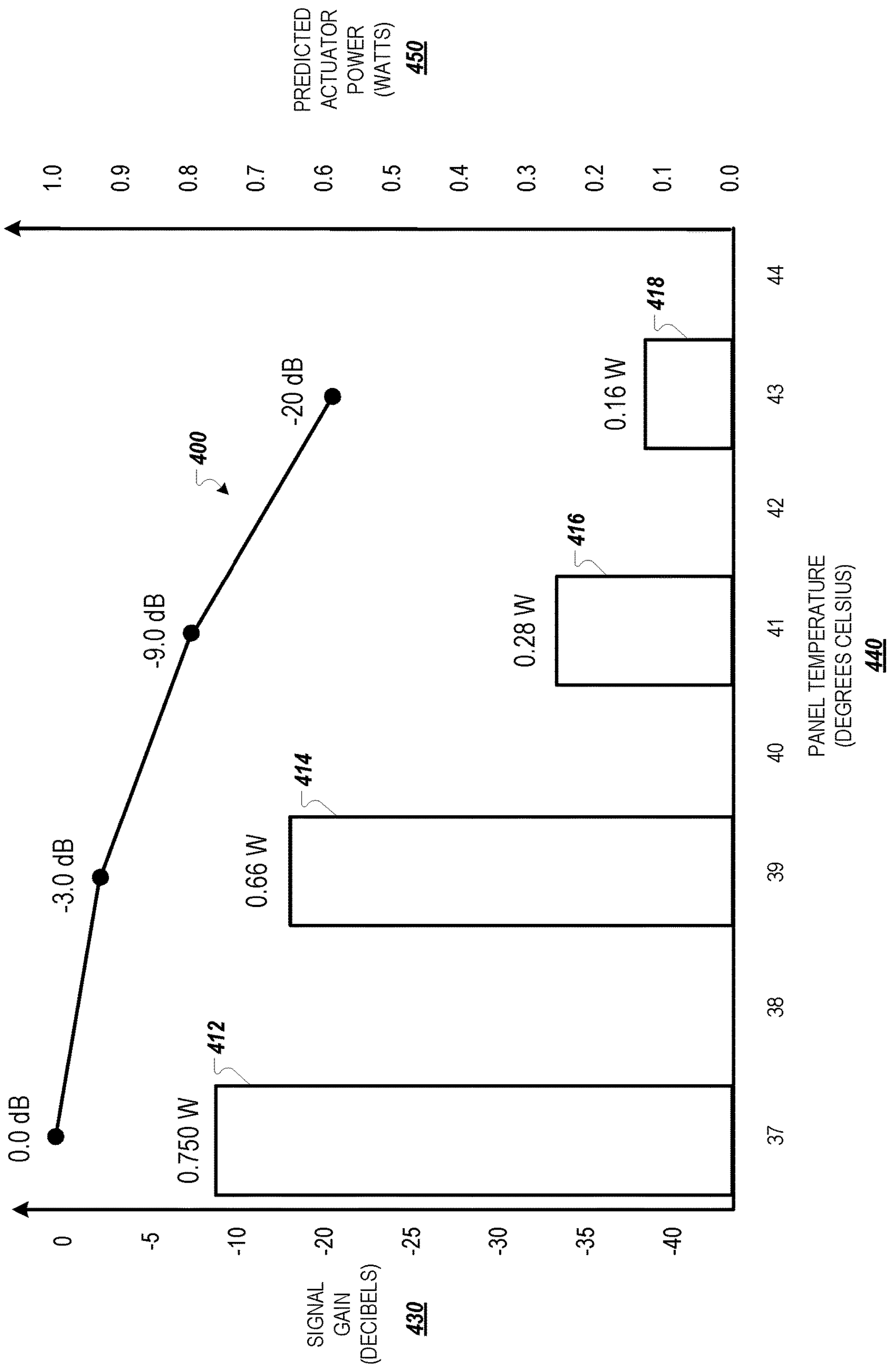
FIG. 4 is an example graph of signal gain and actuator power vs. panel temperature.

FIG. 4 illustrates an example graph of signal gain and actuator power vs. panel temperature. The graph shows a curve 400 of signal gain 430 vs. panel temperature 440. The signal gain 430 can be, for example, the programmed gain adjustment 342 output by the front end processor 314.

As shown in FIG. 4, at a panel temperature of 37.0 C, the signal gain 430 is 0.0 dB. Thus, in this example, at a panel temperature of 37.0 C, the processor 310 does not reduce the power provided to the actuator. At a panel temperature of 39.0 C, the signal gain is −3.0 dB. At a panel temperature of 41.0 C, the signal gain is −9.0 dB. At a panel temperature of 43.0 C, the signal gain is −20.0 dB. The relationship between signal gain 430 and panel temperature 440 can be linear or nonlinear. In some examples, the rate of change of adjustment can be linear. For example, a gain adjustment applied in response to an increase in temperature between 37 C and 39 C may be the same as a gain adjustment applied in response to an increase in temperature between 39 C and 41 C.

In some examples, the rate of change of adjustment can be nonlinear. For example, a gain adjustment applied in response to an increase in temperature between 37 C and 39 C may be different from a gain adjustment applied in response to an increase in temperature between 39 C and 41 C.

In some examples, the rate of change of adjustment to actuator power increases as temperature increases. For example, the gain adjustment applied in response to an increase in temperature between 39 C and 41 C may be greater than the gain adjustment applied in response to an increase in temperature between 37 C and 39 C.

The graph also shows example values of predicted actuator power 450 vs panel temperature 440. The predicted actuator power 450 is the predicted power of the actuator 210 when the programmed signal gain 430 is applied. The predicted actuator power can be the adjusted actuator power 338 selected by the mapping module 312 based on the target temperature.

Figure 5:
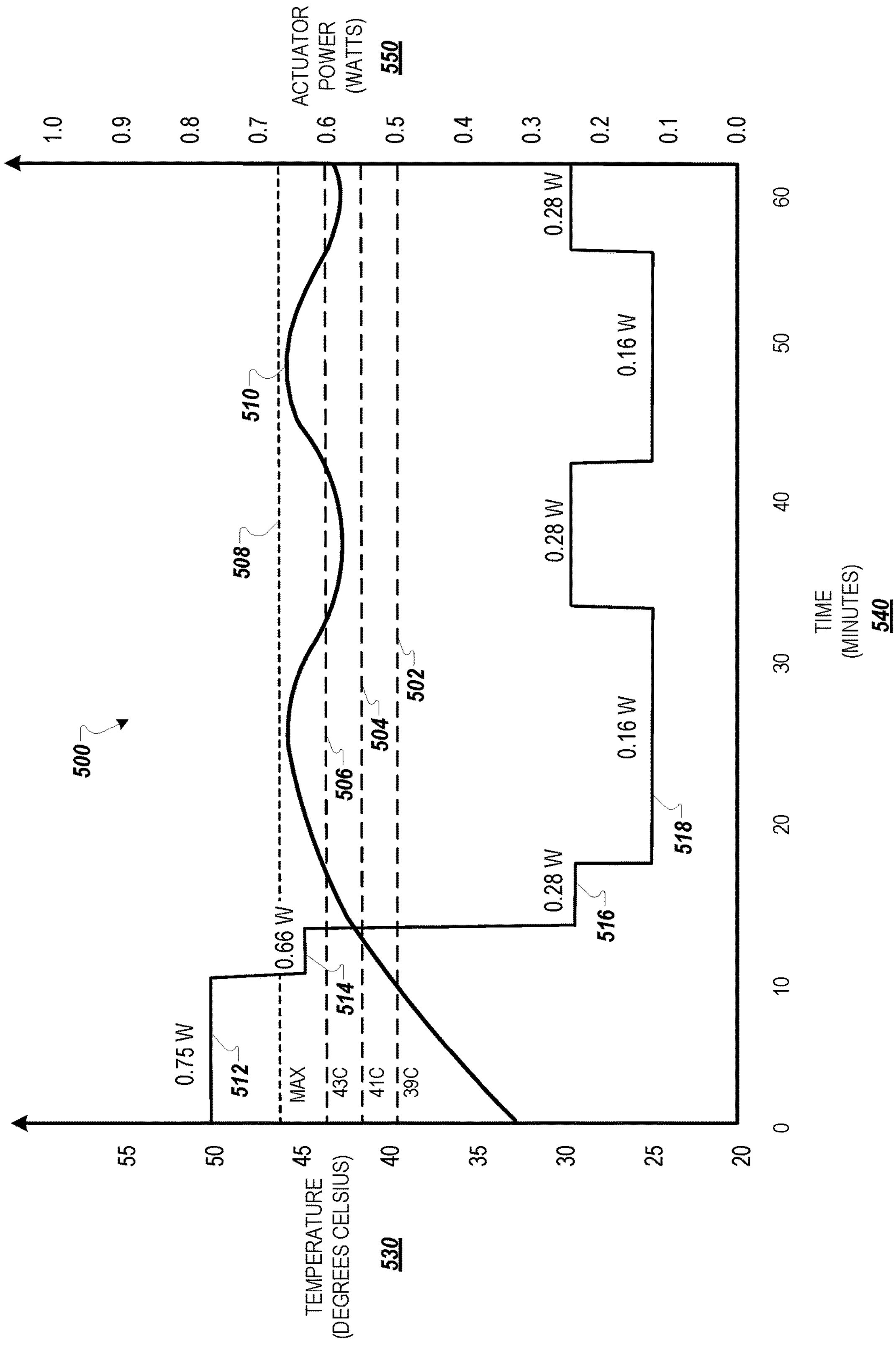
FIG. 5 is an example graph of panel temperature and actuator power over time.

As shown in FIG. 4, at a temperature of 37 C, the signal gain applied is 0.0 dB, resulting in a predicted actuator power 412 of 0.75 W. At a temperature of 39 C, the signal gain applied is −3.0 dB, resulting in a predicted actuator power 414 of 0.66 W. At a temperature of 41 C, the signal gain applied is −9.0 dB, resulting in a predicted actuator power 416 of 0.28 W. At a temperature of 43 C, the signal gain applied is −20.0 dB, resulting in a predicted actuator power 418 of 0.16 W. FIG. 5 illustrates an example graph 500 of panel temperature 530 and actuator power 550 over time 540. The graph 500 shows three temperature thresholds 502, 504, 506, and a maximum allowable temperature 508. A first temperature threshold 502 is at a temperature 39 C. A second temperature threshold 504 is at 41 C. A third temperature threshold 506 is at 43 C. The maximum allowable panel temperature 508 may be, for example, 46 C. Based on determining that the temperature of the display panel exceeds the first temperature threshold 502, the electronic control module adjusts the power signal provided to the actuator from an initial power level to a first reduced power level. For example, the graph 500 shows an initial actuator power 512 of 0.75 W and an initial temperature 510 below 39 C. Between a time of zero minutes and a time of ten minutes, the panel temperature 510 rises due to heat transfer from the actuator 210. At a time of approximately ten minutes, the electronic control module 220 determines that the temperature of the display panel exceeds the first temperature threshold 502. In response to the panel temperature exceeding the first temperature threshold 502, the electronic control module 220 adjusts the power signal provided to the actuator to a first reduced power level 514 of 0.66 W.

The system may determine that the temperature of the display panel exceeds a second temperature threshold. For example, at a time of approximately twelve minutes, the electronic control module 220 determines that the temperature of the display panel exceeds the second temperature threshold 504. In response to the panel temperature exceeding the second temperature threshold 504, the electronic control module 220 adjusts the power signal provided to the actuator to a second reduced power level 516 of 0.28 W. The second reduced power level is lower than the first reduced power level.

In some examples, the difference between the initial power level and the first reduced power level is less than the difference between the first reduced power level and the second reduced power level. For example, the difference between the initial power level and the first reduced power level is 0.090 W. The difference between the first reduced power level and the second reduced power level is 0.38 W. Thus, the difference between the initial power level and the first reduced power level of 0.090 W is less than the difference between the first reduced power level and the second reduced power level of 0.38 W.

In some examples, the difference between the initial power level and the first reduced power level is the same as the difference between the first reduced power level and the second reduced power level. In some examples, the difference between the initial power level and the first reduced power level is greater than the difference between the first reduced power level and the second reduced power level.

As shown in FIG. 5, the temperature 510 rises at a reduced rate when the actuator power is reduced to a reduced power level. At approximately a time of eighteen minutes, the panel temperature exceeds the temperature threshold 506 of 43 C. In response to the panel temperature exceeding the temperature threshold 506, the electronic control module 220 adjusts the power signal provided to the actuator to the third reduced power level 518 of 0.16 W.

Reducing the power signal to the third reduced power level 518 causes the panel temperature to decrease without muting the actuator. At approximately a time of thirty-three minutes, the panel temperature decreases below the temperature threshold 506 of 43 C.

The electronic control module 220 continues to adjust actuator power based on panel temperature over time. As the panel temperature exceeds a temperature threshold, the actuator power is reduced. When the panel temperature returns below a temperature threshold, the actuator power is increased.

In some cases, temperature thresholds for reducing actuator power may be different from temperature thresholds for raising actuator power. For example, actuator power may be reduced when the panel temperature exceeds the third temperature threshold of 43 C. After reducing the actuator power, the actuator power might not be raised again until the panel temperature drops to a temperature that is a margin below the temperature threshold of 43 C. For example, the actuator panel may be raised when the panel temperature drops to a temperature of 42.5 C or 42.0 C.

As shown in FIG. 5, the panel temperature can be maintained at or below a maximum temperature 508, e.g., of 46 C. The described technique of adjusting the actuator power based on panel temperature can reduce the amount of time that the sound quality of the audio is affected. For example, the graph 500 shows varying temperatures over a time period of about sixty minutes. The actuator operates at an unreduced power for about ten of the sixty minutes. The actuator operates at a reduced power for approximately forty minutes out of the sixty minutes. Thus, though the panel temperature is operating at high temperatures for a large fraction of the sixty minute time period, the electronic control module 220 is able to maintain the actuator in operation throughout the time period, while maintaining the panel temperature below the maximum temperature 508.

Figure 6:
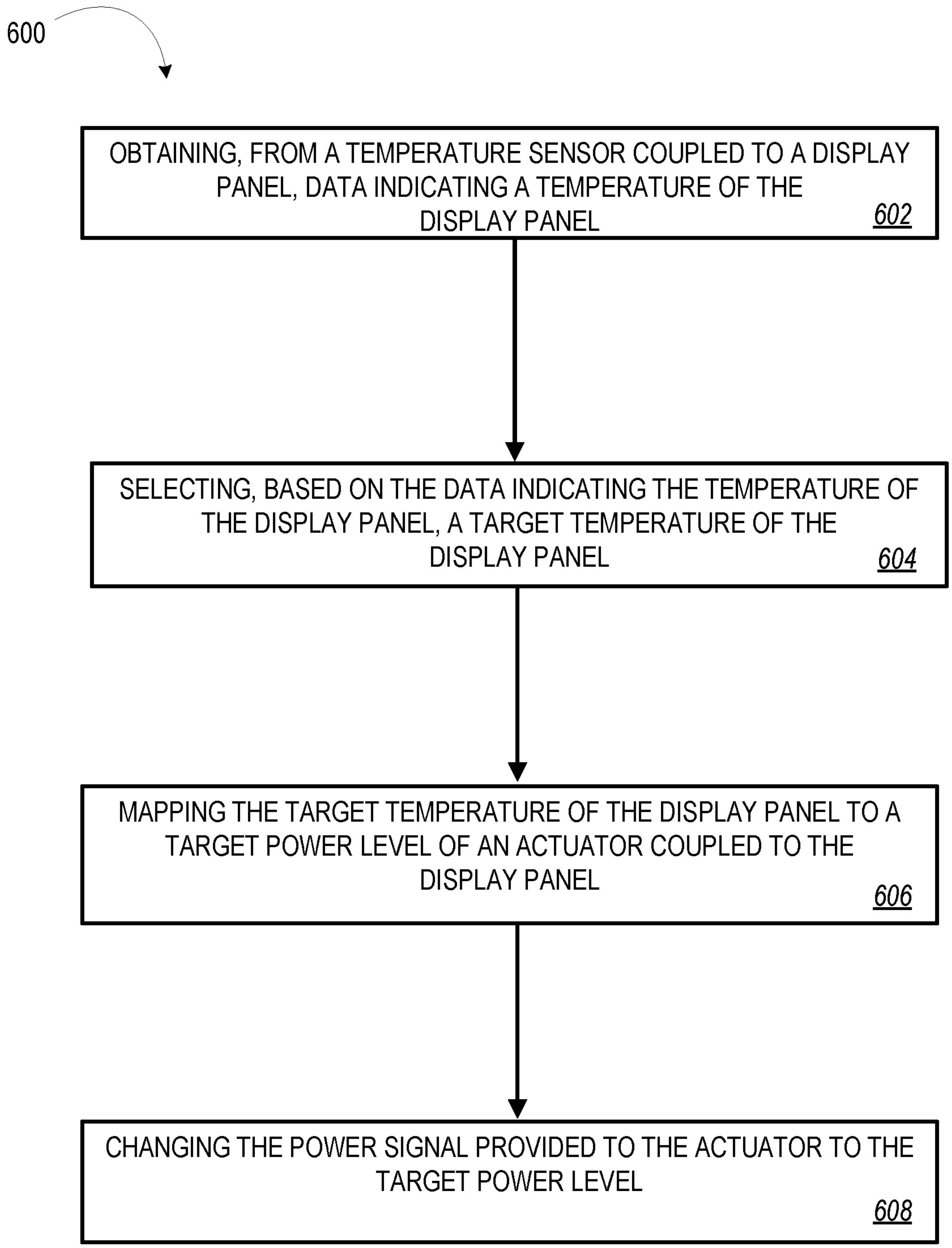
FIG. 6 is a flowchart of an example process for controlling temperature of a panel in a panel audio device.

FIG. 6 is a flowchart of an example process 600 for controlling temperature of a panel in a panel audio device. The process 600 can be performed by a computing system, for example, by the electronic control module 220 of the mobile device 100.

Briefly, process 600 includes obtaining, from a temperature sensor coupled to a display panel, data indicating a temperature of the display panel (602), selecting, based on the data indicating the temperature of the display panel, a target temperature of the display panel (604), mapping the target temperature of the display panel to a target power level of an actuator coupled to the display panel (606), and changing the power signal provided to the actuator to the target power level (608).

In additional detail, the process 600 includes obtaining, from a temperature sensor coupled to a display panel, data indicating a temperature of the display panel (602). For example, the system can obtain temperature data 322 from the temperature sensor 320. The temperature data indicates a temperature of the panel. In some examples, the temperature data indicates a temperature that is related to the panel. For example, the temperature data may indicate a temperature of a housing of the mobile device. The temperature of the housing may have a known or predictable relationship with the temperature of the panel. Thus, the system may determine an estimated temperature of the panel based on the temperature of the housing.

The process 600 includes selecting, based on the data indicating the temperature of the display panel, a target temperature of the display panel (604). For example, the data indicating the temperature of the panel may indicate that the panel temperature is at or near a temperature threshold. Based on the temperature of the panel being at or near the temperature threshold, the system can select a target temperature of the panel. The target temperature may be a temperature that is at or below the temperature threshold.

The process 600 includes mapping the target temperature of the display panel to a target power level of an actuator coupled to the display panel (606). For example, the system can access stored data that maps panel temperatures to corresponding actuator power levels. The system can select, as a target power level, the corresponding actuator power level that is expected to limit the panel temperature to a temperature that is at or below the target temperature.

The process 600 includes changing the power signal provided to the actuator to the target power level (608). For example, the system can adjust a gain of the power signal provided to the actuator. In some cases, the system can apply a negative gain in order to reduce the power signal to the target power level. In some cases, the system can apply a positive gain in order to raise the power signal to the target power level. The power signal provided to the actuator can be adjusted gradually in order to maintain high sound quality of the panel audio loudspeaker. For example, the temperature of the panel can be maintained below limits while maintaining the loudness, stereo balance, and clarity of the panel audio loudspeaker.

Figure 7:
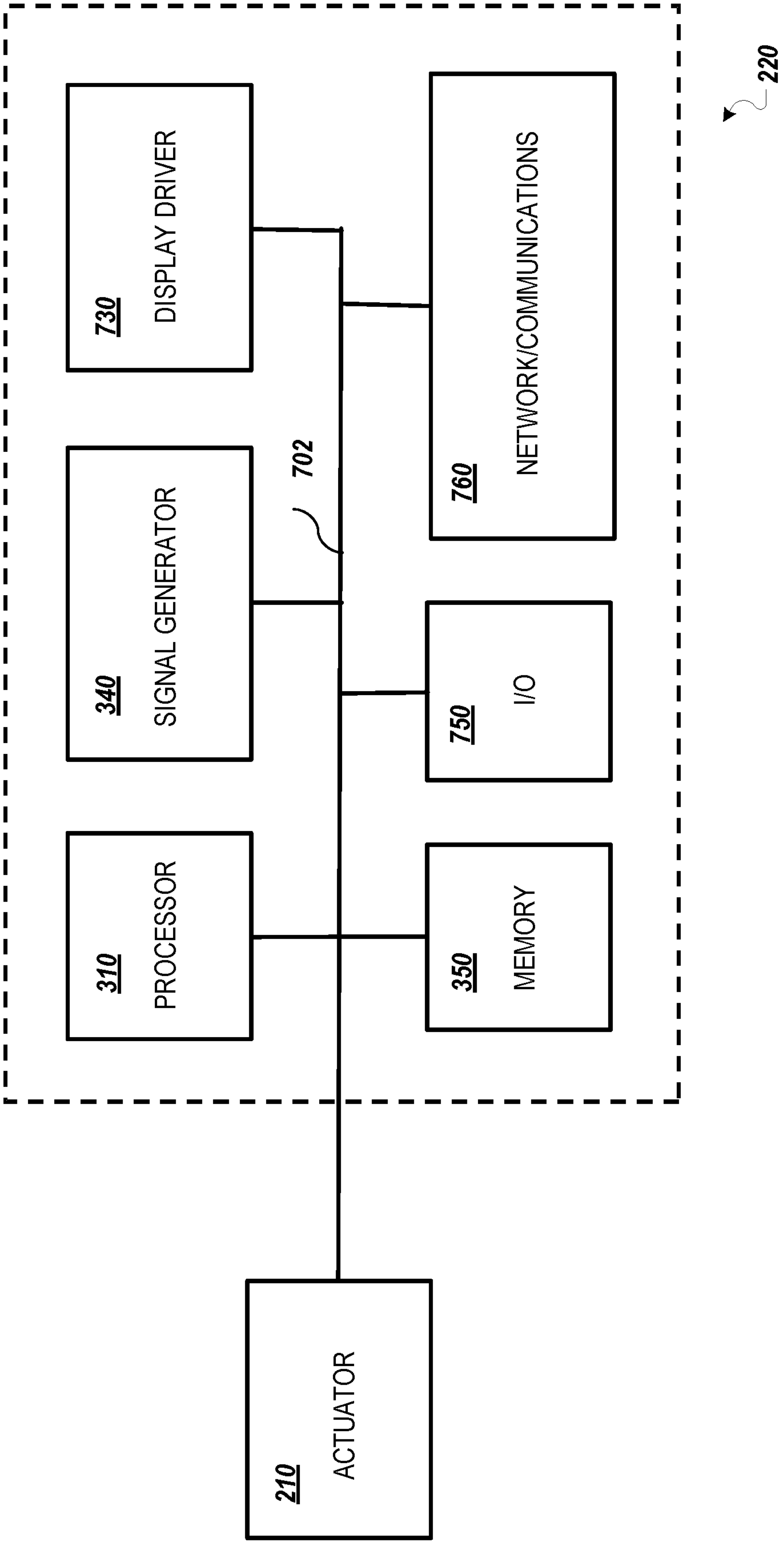
FIG. 7 is a schematic diagram of an embodiment of an electronic control module for a mobile device.

Referring to FIG. 7, an exemplary electronic control module 220 of a mobile device, such as mobile device 100, includes a processor 310, memory 350, a display driver 730, a signal generator 340, an input/output (I/O) module 750, and a network/communications module 760. These components are in electrical communication with one another (e.g., via a signal bus 702) and with the actuator 210.

The processor 310 may be implemented as any electronic device capable of processing, receiving, or transmitting data or instructions. For example, the processor 310 can be a microprocessor, a central processing unit (CPU), an application-specific integrated circuit (ASIC), a digital signal processor (DSP), or combinations of such devices.

The memory 350 has various instructions, computer programs or other data stored thereon. The instructions or computer programs may be configured to perform one or more of the operations or functions described with respect to the mobile device. For example, the instructions may be configured to control or coordinate the operation of the device's display via the display driver 730, the signal generator 340, one or more components of the I/O module 750, one or more communication channels accessible via network/communications module 760, one or more sensors (e.g., biometric sensors, temperature sensors, accelerometers, optical sensors, barometric sensors, moisture sensors and so on), and/or the actuator 210.

The signal generator 340 is configured to produce AC waveforms of varying amplitudes, frequency, and/or pulse profiles suitable for the actuator 210 and producing acoustic and/or haptic responses via the actuator. Although depicted as a separate component, in some embodiments, the signal generator 340 can be part of the processor 310. In some embodiments, the signal generator 340 can include an amplifier, e.g., as an integral or separate component thereof.

The memory 350 can store electrical data that can be used by the mobile device. For example, the memory 350 can store electrical data or content such as, for example, audio and video files, documents and applications, device settings and user preferences, timing and control signals or data for the various modules, data structures or databases, and so on. The memory 350 may also store instructions for recreating the various types of waveforms that may be used by the signal generator 340 to generate signals for the actuator 210. The memory 350 may be any type of memory such as, for example, random access memory, read-only memory, Flash memory, removable memory, or other types of storage elements, or combinations of such devices.

As briefly discussed above, the electronic control module 220 may include various input and output components represented in FIG. 7 as I/O module 750. Although the components of I/O module 750 are represented as a single item in FIG. 7, the mobile device may include a number of different input components, including buttons, microphones, switches, and dials for accepting user input. In some embodiments, the components of the I/O module 750 may include one or more touch sensor and/or force sensors. For example, the mobile device's display may include one or more touch sensors and/or one or more force sensors that enable a user to provide input to the mobile device.

Each of the components of the I/O module 750 may include specialized circuitry for generating signals or data. In some cases, the components may produce or provide feedback for application-specific input that corresponds to a prompt or user interface object presented on the display.

As noted above, the network/communications module 760 includes one or more communication channels. These communication channels can include one or more wireless interfaces that provide communications between the processor 310 and an external device or other electronic device. In general, the communication channels may be configured to transmit and receive data and/or signals that may be interpreted by instructions executed on the processor 310. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of the network/communications module 760 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the mobile device 100 to a mobile phone for output on that device and vice versa. Similarly, the network/communications module 760 may be configured to receive input provided on another device to control the mobile device. For example, an audible alert, visual notification, or haptic alert (or instructions therefore) may be transmitted from the external device to the mobile device for presentation.

The actuator technology disclosed herein can be used in panel audio systems, e.g., designed to provide acoustic and/or haptic feedback. The panel may be a display system, for example based on OLED of LCD technology. The panel may be part of a smartphone, tablet computer, or wearable devices (e.g., smartwatch or head-mounted device, such as smart glasses).

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

Other embodiments are in the following claims.

What is claimed is:

1. A mobile device, comprising:
- a panel audio loudspeaker comprising:
  - a display panel; and
  - an actuator coupled to the display panel;
- a temperature sensor arranged to sense a temperature of the display panel; and
- an electronic control module in communication with the actuator and the temperature sensor, programmed to perform operations comprising:
  - obtaining, from the temperature sensor, data indicating the temperature of the display panel;
  - determining that the temperature of the display panel exceeds a temperature threshold; and
  - based on determining that the temperature of the display panel exceeds the temperature threshold and the actuator being in operation, adjusting, to a reduced power level, a power signal provided to the actuator to drive the panel audio loudspeaker by adjusting a gain of the power signal within a programmed range of frequencies.

2. The mobile device of claim 1, wherein the electronic control module is programmed to adjust the power signal provided to the actuator by:
- selecting, based on the data indicating the temperature of the display panel, a target temperature of the display panel;
- mapping the target temperature of the display panel to a target power level of the actuator; and
- changing the power signal provided to the actuator to the target power level.

3. The mobile device of claim 1, wherein the temperature sensor comprises a thermistor.

4. The mobile device of claim 1, wherein the temperature sensor is coupled to the display panel.

5. The mobile device of claim 1, wherein the temperature sensor is coupled to a housing, to a processor, or to a circuit board of the mobile device.

6. The mobile device of claim 1, comprising an amplifier configured to provide the power signal to the actuator, wherein the electronic control module is programmed to adjust the power signal provided to the actuator by adjusting a gain of the amplifier.

7. The mobile device of claim 1, wherein the electronic control module is programmed to perform operations comprising:

determining that the temperature of the display panel exceeds a first temperature threshold;

based on determining that the temperature of the display panel exceeds the first temperature threshold, adjusting the power signal provided to the actuator from an initial power level to a first reduced power level;

determining that the temperature of the display panel exceeds a second temperature threshold; and based on determining that the temperature of the display panel exceeds the second temperature threshold, adjusting the power signal provided to the actuator to a second reduced power level, the second reduced power level being lower than the first reduced power level.

8. The mobile device of claim 7, wherein the difference between the initial power level and the first reduced power level is the same as the difference between the first reduced power level and the second reduced power level.

9. The mobile device of claim 7, wherein the difference between the initial power level and the first reduced power level is less than the difference between the first reduced power level and the second reduced power level.

10. The mobile device of claim 7, wherein the difference between the initial power level and the first reduced power level is greater than the difference between the first reduced power level and the second reduced power level.

11. The mobile device of claim 1, wherein the programmed range of frequencies is 10 kHz or greater.

12. The mobile device of claim 1, wherein the programmed range of frequencies is 400 Hz or less.

13. The mobile device of claim 1, wherein the electronic control module is programmed to perform operations comprising:

obtaining, from a second temperature sensor, data indicating a temperature of a processor of the mobile device; and based on the data indicating the temperature of the processor of the mobile device and the data indicating the temperature of the display panel, adjusting the power signal provided to the actuator.

14. The mobile device of claim 1, wherein the electronic control module is programmed to perform operations comprising:

obtaining, from a second temperature sensor, data indicating a temperature of a housing of the mobile device; and based on the data indicating the temperature of the housing of the mobile device and the data indicating the temperature of the display panel, adjusting the power signal provided to the actuator.

15. The mobile device of claim 1, wherein the electronic control module is programmed to perform operations comprising:

obtaining data indicating:

one or more current operations of the mobile device; and a priority level for each of the one or more current operations of the mobile device;

determining that the priority level for at least one of the one or more current operations of the mobile device is a higher priority level than operation of the actuator; and based on determining that the priority level for at least one of the one or more current operations of the mobile device is a higher priority level than operation of the actuator, adjusting the power signal provided to the actuator.

16. A method for driving a panel audio loudspeaker comprising a display panel and an actuator coupled to the display panel, the method comprising:

obtaining, from a temperature sensor arranged to sense a temperature of the display panel, data indicating the temperature of the display panel;

determining that the temperature of the display panel exceeds a temperature threshold; and based on determining that the temperature of the display panel exceeds the temperature threshold and the actuator being in operation, adjusting, to a reduced power level, a power signal provided to the actuator to drive the panel audio loudspeaker by adjusting a gain of the power signal within a programmed range of frequencies.

17. A mobile device, comprising:

a panel audio loudspeaker comprising:

a display panel; and an actuator coupled to the display panel;

a temperature sensor arranged to sense a temperature of the display panel; and an electronic control module in communication with the actuator and the temperature sensor, programmed to perform operations comprising:

obtaining, from the temperature sensor, data indicating the temperature of the display panel;

determining that the temperature of the display panel exceeds a first temperature threshold;

based on determining that the temperature of the display panel exceeds the first temperature threshold, adjusting a power signal provided to the actuator to drive the panel audio loudspeaker from an initial power level to a first reduced power level;

determining that the temperature of the display panel exceeds a second temperature threshold; and based on determining that the temperature of the display panel exceeds the second temperature threshold, adjusting the power signal provided to the actuator to drive the panel audio loudspeaker to a second reduced power level, the second reduced power level being lower than the first reduced power level.

18. A mobile device, comprising:

a panel audio loudspeaker comprising:

a display panel; and an actuator coupled to the display panel;

a temperature sensor arranged to sense a temperature of the display panel; and an electronic control module in communication with the actuator and the temperature sensor, programmed to perform operations comprising:

obtaining, from the temperature sensor, data indicating the temperature of the display panel;

obtaining, from a second temperature sensor, data indicating a temperature of a processor or a housing of the mobile device; and based on the data indicating the temperature of the processor or the housing of the mobile device and the data indicating the temperature of the display panel, adjusting a power signal provided to the actuator to drive the panel audio loudspeaker.

19. A mobile device, comprising:

a panel audio loudspeaker comprising:

a display panel; and an actuator coupled to the display panel;

a temperature sensor arranged to sense a temperature of the display panel; and an electronic control module in communication with the actuator and the temperature sensor, programmed to perform operations comprising:

obtaining, from the temperature sensor, data indicating the temperature of the display panel;

obtaining data indicating:

one or more current operations of the mobile device; and a priority level for each of the one or more current operations of the mobile device;

determining that the priority level for at least one of the one or more current operations of the mobile device is a higher priority level than operation of the actuator; and based on (i) the data indicating the temperature of the display panel and (ii) determining that the priority level for at least one of the one or more current operations of the mobile device is a higher priority level than operation of the actuator, adjusting a power signal provided to the actuator to drive the panel audio loudspeaker.

20. A method for driving a panel audio loudspeaker comprising a display panel and an actuator coupled to the display panel, the method comprising:

obtaining, from a temperature sensor arranged to sense a temperature of the display panel, data indicating the temperature of the display panel;

determining that the temperature of the display panel exceeds a first temperature threshold;

based on determining that the temperature of the display panel exceeds the first temperature threshold, adjusting a power signal provided to the actuator to drive the panel audio loudspeaker from an initial power level to a first reduced power level;

determining that the temperature of the display panel exceeds a second temperature threshold; and based on determining that the temperature of the display panel exceeds the second temperature threshold, adjusting the power signal provided to the actuator to drive the panel audio loudspeaker to a second reduced power level, the second reduced power level being lower than the first reduced power level.

* * * * *